(12) United States Patent
Kinstler

(10) Patent No.: US 7,152,134 B2
(45) Date of Patent: Dec. 19, 2006

(54) INTERFACING A LEGACY DATA BUS WITH A WIDEBAND DATA BUS UTILIZING AN EMBEDDED BUS CONTROLLER

(75) Inventor: Gary A. Kinstler, Torrance, CA (US)

(73) Assignee: The Boeing Company, Chicago, IL (US)

( * ) Notice: Subject to any disclaimer, the term of this patent is extended or adjusted under 35 U.S.C. 154(b) by 388 days.

(21) Appl. No.: 10/412,183

(22) Filed: Apr. 11, 2003

(65) Prior Publication Data

US 2004/0205285 A1    Oct. 14, 2004

(51) Int. Cl.
*G06F 1/00* (2006.01)
(52) U.S. Cl. .................. 710/315; 710/306; 710/63; 710/72
(58) Field of Classification Search ........ 710/311–315, 710/305–306, 58–69, 72, 33–34, 307, 8–19; 370/467, 538
See application file for complete search history.

(56) References Cited

U.S. PATENT DOCUMENTS

| | | | | |
|---|---|---|---|---|
| 5,848,294 A | * | 12/1998 | Clark ............................ | 710/36 |
| 5,875,313 A | * | 2/1999 | Sescila et al. ................ | 710/305 |
| 5,898,801 A | * | 4/1999 | Braun et al. .................. | 385/24 |
| 5,991,546 A | * | 11/1999 | Chan et al. .................... | 710/62 |
| 6,169,746 B1 | * | 1/2001 | Ueda et al. ................... | 370/466 |
| 6,202,103 B1 | * | 3/2001 | Vonbank et al. ............... | 710/15 |
| 6,266,729 B1 | * | 7/2001 | Leung et al. ................. | 710/313 |
| 6,356,968 B1 | * | 3/2002 | Kishon ......................... | 710/306 |
| 6,507,579 B1 | * | 1/2003 | Gresham ...................... | 370/358 |
| 6,615,116 B1 | * | 9/2003 | Ebert et al. ..................... | 701/3 |
| 6,693,895 B1 | * | 2/2004 | Crummey et al. ........... | 370/352 |
| 6,831,926 B1 | * | 12/2004 | Kinstler ....................... | 370/467 |
| 6,904,530 B1 | * | 6/2005 | Frank ........................... | 713/300 |
| 2003/0101310 A1 | * | 5/2003 | Granato et al. ............. | 710/306 |
| 2004/0205284 A1 | * | 10/2004 | Kinstler ....................... | 710/315 |

* cited by examiner

*Primary Examiner*—John R. Cottingham
*Assistant Examiner*—Raymond N Phan
(74) *Attorney, Agent, or Firm*—Ingrassia Fisher & Lorenz, P.C.

(57) ABSTRACT

Various methods and systems provide interfaces between legacy data buses such as MIL-STD 1553 buses and wideband data buses such as IEEE 1394 data buses. One technique for interfacing a legacy bus to a wideband data bus involves providing a hybrid bus controller/remote interface unit as an interface between the two buses. In operation, the legacy interface suitably receives data intended for a legacy node from a wideband data bus capable node. The legacy data is converted in the legacy interface/remote interface unit to at least one legacy word having a legacy format for transmission on the legacy data bus. The legacy interface may be further configured to receive a reply to the wideband data bus capable node message from the legacy component on the legacy data bus, and to forward the reply to the wideband data bus capable node component.

13 Claims, 4 Drawing Sheets

INTERFACING A LEGACY DATA BUS WITH A WIDEBAND DATA BUS UTILIZING AN EMBEDDED BUS CONTROLLER

TECHNICAL FIELD OF THE INVENTION

The present invention generally relates to data communications technologies, and more particularly relates to systems and techniques for interfacing legacy equipment to high-speed data communications buses and networks.

BACKGROUND OF THE INVENTION

Modern computing and control systems such as those found in aircraft and spacecraft typically include multiple sensing and/or processing components that are interconnected by a data network. Systems used in a typical avionics environment include flight management systems, air data computers, engine and air sensors, flight control systems, cockpit instrumentation and the like.

As the various computing systems used in these environments become increasingly capable, wideband data communications technologies have evolved to support faster data transfer rates between components and systems in many aerospace, industrial, transportation and other settings. The IEEE 1394b standard, for example, describes a bus implementation that supports data transfer speeds of 800 Mbps or higher over a serial connection. Other wideband data connection technologies providing high-speed data transfer include fiber data definition interface (FDDI), asynchronous transfer mode (ATM), Fiber Channel, Fast Ethernet and the like.

Even as new data communications technologies become increasingly prevalent, however, legacy systems based upon older technologies continue in widespread use. Many of these systems remain in operation due to their high reliability, and due to the relatively long periods of time often required to design, build and obtain government certification for newer systems. Systems and components designed to communicate using the MIL-STD 1553 standard, for example, have been widely deployed in aviation, space and other environments for many years. MIL-STD 1553 networks typically include a bus controller (BC) that controls traffic on a redundant bus that interconnects various remote terminal (R/T) client nodes. MIL-STD 1553 generally specifies that data is transferred between nodes in packets of not more than thirty-two data words (with each word including sixteen data bits and four control bits) across redundant twisted-pair wires with a data rate on the order of 1 MHz. The MIL-STD 1553B standard (which was a revision of earlier MIL-STD 1553 standards) was released as a tri-service/NATO standard in 1978, and is widely available.

It is generally desirable for the legacy and non-legacy components within an aircraft, spacecraft or other environment to share data and otherwise interoperate with each other. In particular, it is generally desirable to interface legacy components with newer bus technologies to take advantage of the increased bandwidth available, and to eliminate the need to provide legacy wiring throughout the vehicle or other environment. Often, however, difficulties arise in interfacing older "legacy" systems to newer technologies. MIL-STD 1553 components, for example, are highly reliable, yet generally incompatible with newer wideband technologies without significant modification. Although several products are available to interface legacy components to newer data networks, problems often remain in implementation of these products. As an example of a design difficulty to be overcome, MIL-STD 1553 typically specifies that each transmitting component receive a "handshake" response from the receiving component within fourteen microseconds of the original data transmission. While this requirement is relatively easy to meet on a conventional MIL-STD 1553 bus, it is often difficult to meet in practice when legacy components communicate across other types of data connections. In particular, the fourteen microsecond handshake period limits the ability to locate bus controllers and remote terminals on separate bus segments, thereby limiting design flexibility. Accordingly, difficulties remain in achieving true integration between the various computing systems and components operating within an avionics or other environment. Moreover, the cost, weight and complexity of providing separate legacy and wideband networks can present significant issues in highly demanding environments.

It is therefore desirable to allow legacy systems such as those based upon MIL-STD 1553 to communicate across newer high-speed data buses such as those based upon IEEE 1394 and other standards. Further, it is desirable to use high-speed data buses to interconnect legacy bus controllers and remote terminals without requiring additional cabling or excessive modifications to the legacy components. It is therefore highly desirable to create systems and methods for interfacing legacy equipment to high-speed data buses. Furthermore, other desirable features and characteristics of the present invention will become apparent from the subsequent detailed description and the appended claims, taken in conjunction with the accompanying drawings and the foregoing technical field and background.

BRIEF SUMMARY OF THE INVENTION

Various methods and systems provide interfaces between legacy data buses such as MIL-STD 1553 buses and wideband data buses such as IEEE 1394 data buses. One technique for interfacing a legacy bus to a wideband data bus involves providing a hybrid bus controller/remote interface unit as an interface between the two buses. In operation, the legacy interface suitably receives data intended for a legacy node from a wideband data bus capable node. The legacy data is converted to at least one legacy word having a legacy format for transmission on the legacy data bus. The legacy interface may be further configured to receive a reply to the wideband data bus capable node message from the legacy component on the legacy data bus, and to forward the reply to the wideband data bus capable node component.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

According to various embodiments, legacy systems such as those based upon MIL-STD 1553 technologies are appropriately interfaced to high-speed, wideband data networks and/or buses using one or more remote interface units (RIUs) or other legacy interfaces. Each interface suitably receives data intended for a legacy node from a wideband data bus capable node. The legacy data is converted to a legacy format for transmission on the legacy data bus. The legacy interface may be further configured to receive a reply to the wideband data bus capable node message from the legacy component on the legacy data bus, and to forward the reply to the wideband data bus capable node component. The legacy data may be divided into relatively small data packets to facilitate transmission in relatively narrow timeslots on the wideband bus, and to thereby reduce latency during transmission. In various embodiments, the functions of a legacy bus controller may be incorporated into a remote interface unit that bridges a legacy bus to the wideband network. In such embodiments the interface appropriately provides handshake responses and/or status responses to the legacy components as appropriate to avoid timeout errors.

By implementing the systems and techniques described herein, legacy nodes are suitably allowed to share data and/or to otherwise interoperate with wideband nodes without requiring significant modification. Moreover, the number of legacy buses (and associated cabling) required in many data sharing environments may be reduced by providing legacy traffic across wideband networks rather than the comparatively limited legacy buses.

As used herein, the terms "component" and "device" are intended to broadly encompass any computers, computing devices, sensors, input/output devices, modules and/or processes that are capable of processing or gathering data, and that are capable of communicating in any data communications environment. Unless context dictates otherwise, the term "bus" as used herein is intended to broadly encompass any serial or parallel bus architecture or topology, as well as any other network or other inter-connection between computing devices. "High speed" buses as described herein may include any wideband digital, optical, wireless or other networking or bus technology or protocol. Similarly, the term "legacy" systems is intended to encompass MIL-STD 1553, as well as any other technologies, systems, components and/or protocols that may be adapted for use on high-speed buses as described herein.

Figure 1A:
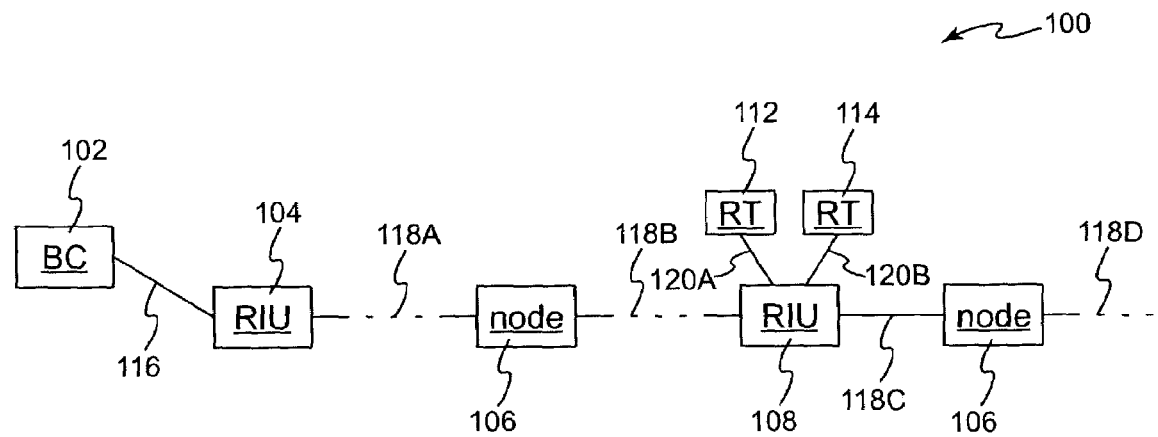
FIG. 1A is a block diagram of an exemplary system facilitating legacy data transmission on a high-speed data bus.

With reference now to FIG. 1A, an exemplary system 100 for interfacing legacy systems to a wideband data bus suitably includes one or more remote interface units (RIUs) 104, 108 allowing a legacy bus controller 102 to communicate with one or more remote terminals (R/Ts) 112, 114 across a wideband bus 118. RIUs 104, 108 are any systems, processing cards, or other computing devices capable of interfacing legacy components to wideband buses, and are described in additional detail below. Bus controller (BC) 102 is any conventional card, application or device that is responsible for directing the flow of data on one or more legacy bus segments 120 as appropriate. In the case of MIL-STD 1553 bus controllers, each bus segment 116, 120 may have one or more bus controllers, although only one may be active at any time. R/Ts 112, 114 are any devices and/or processes capable of communicating over legacy bus segments 120A and 120B, respectively, and may include data sensors (e.g. a radio altimeter), navigation aids, or the like. Although two legacy bus segments 112, 114 are shown in system 100, any-number of legacy buses and/or segments may be provided in a wide array of equivalent embodiments.

Wideband bus 118 is any bus or other network interconnection capable of transmitting data between RIUs 104 and 108 or between wideband capable nodes 106 and RIUs 104 and 108. In an exemplary embodiment, wideband bus 118 includes several data bus segments 118A–D operating in compliance with the IEEE 1394b specification, although other wideband bus or network technologies such as other versions of IEEE 1394, Fiber Channel or Fast Ethernet could be used in equivalent embodiments. FIG. 1 also shows several nodes 106 operating on wideband bus 118 in a native mode. To continue the example using IEEE 1394b buses, the various nodes 106 and RIUs 104, 108 are suitably interconnected by various bus segments 118A–D in a linear fashion, although other network topologies (e.g. tree, ring, hub and the like) could be used in alternate embodiments.

In operation, bus controller 102 suitably communicates with remote terminals 112, 114 and manages traffic on legacy bus segments 120A–B via remote interface units 104, 108. Data originating from BC 102 is provided in legacy format from BC 102 to RIU 104 via legacy bus segment 116, which may operate using the same standards and/or protocols as bus segments 120A–B. RIU 104 suitably receives data across bus segment 116 and contacts RIU 108 via wideband bus 118 to transfer the data as appropriate. In various exemplary embodiments, RIU 104 transfers legacy data from legacy BC 102 by dividing the data into several smaller portions and requesting immediate and/or acknowledge-accelerated arbitration access to wideband bus 118. RIU 108 suitably receives the data portions from RIU 104, re-assembles the data in legacy format, and provides the data to the destination R/T 112, 114 via legacy bus segments 120A–B. Return data is sent via an opposite path, with the sending R/T 112, 114 providing data to RIU 108 via legacy bus segments 120A–B, which obtains timeslots on wideband bus 118 to transfer the data to RIU 104. RIU 104, in turn, re-assembles the data and provides the resulting data in legacy format to BC 102 via legacy bus segment 116. In a further embodiment, timeout limits (e.g. time budgets allocated for responses by R/Ts 112, 114) on the various legacy components are adjusted to compensate for the additional delays incurred during transit, as described more fully below. Alternatively, RIUs 104, 108 may provide status words to transmitting legacy components to notify them that return data is in transit, thereby preventing timeout errors from occurring.

Figure 1B:
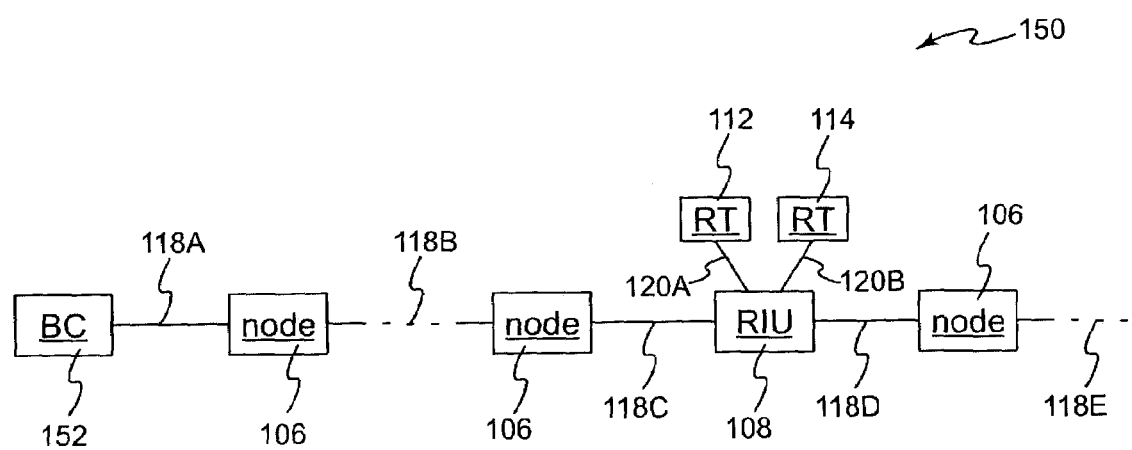
FIG. 1B is a block diagram of an alternate exemplary system facilitating legacy data transmission on a high-speed data bus.

The exemplary system 100 shown in FIG. 1A may be modified in many ways. Any number of native wideband nodes 106 (within the inherent node limits of the native wideband bus employed) may be present in equivalent embodiments, for example, as may any number of legacy nodes 112, 114 operating on any number of legacy bus segments 120A–B. Indeed, multiple RIUs 108 may be provided on wideband bus 118, with each RIU 108 coupling any number of legacy bus segments 120 to wideband bus 118. In such embodiments, a single bus controller 102 could be used to manage traffic on each of the various legacy buses, thereby reducing duplication in function and improving cost efficiency in some embodiments. Further, one or more of the RIUs 104, 108 could be eliminated in alternate embodiments. FIG. 1B, for example, shows an alternate system 150 for controlling legacy data bus segments 120A–B across wideband bus 118 that includes a bus controller node 152 that is able to natively communicate on wideband bus 118 without an additional RIU 104. Further embodiments that combine the functionalities of BC 102 and RIU 108 are described in detail below.

Figure 2:
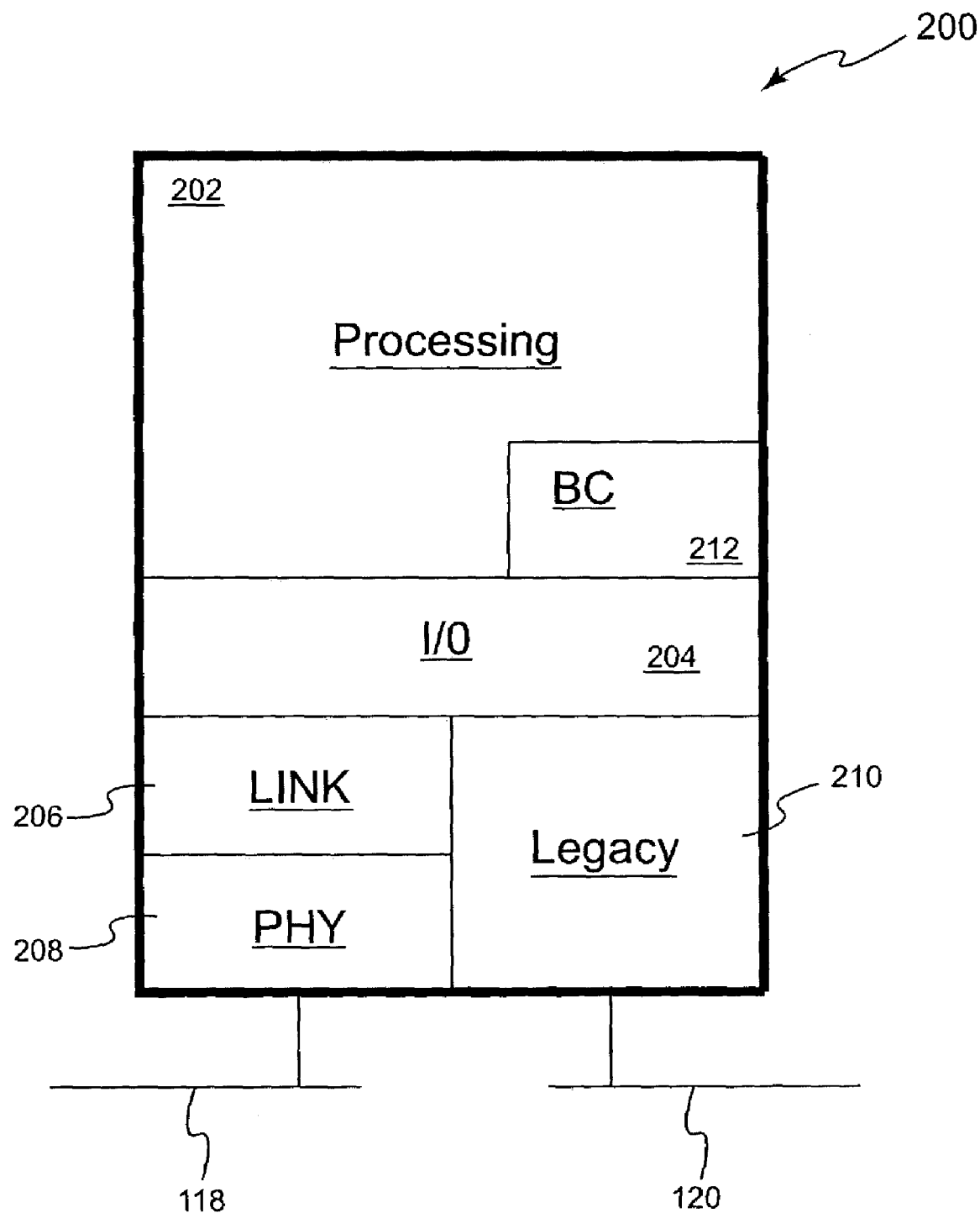
FIG. 2 is a block diagram of an exemplary legacy interface.

As used herein, a "legacy interface" broadly refers to any device or component that provides an interface between a legacy bus and a wideband bus. Examples of legacy interfaces include RIUs 104/108 (FIGS. 1A–1B), bus controller 152 (FIG. 1B), and the like. With reference now to FIG. 2, an exemplary legacy interface 200 suitably includes a legacy input/output (I/O) module 210, wideband PHY and LINK layer implementations 208, 206 (respectively), an I/O subsystem 204, and a data processing module 202.

In an exemplary embodiment, legacy I/O module 210 is implemented with a conventional MIL-STD 1553 card or other implementation available from multiple commercial sources, including Data Device Corp. of Bohemia, N.Y., as well as Condor Engineering Inc. of Santa Barbara, Calif. and others. PHY module 208 and LINK module 206 may be implemented using conventional IEEE 1394b chips, cards or other implementations. Examples of PHY and LINK layer hardware implementations are available from Texas Instruments (TI) of Plano, Tex. and others. Exemplary TI part number TSB81BA3 for a 3-port Cable Transceiver/Arbiter could be used in an exemplary PHY implementation 208, for example, and TI part number TSB82AA2 for a IEEE 1394b Open Host Controller Interface (OHCI) could be used in an exemplary LINK implementation 206. Other protocols, products and/or implementations, however, could be used in a wide range of alternate embodiments. I/O subsystem 204 may be implemented using conventional hardware or software components (e.g. operating system components) that are capable of granting access to I/O resources on legacy interface 200.

Processing module 202 includes any number of applications, applets, programs, routines, objects or the like executing on any processor and written in any programming language. The various programs included within processing module appropriately implement the various functions carried out by legacy interface 200, including data transfer and/or bus control functionality. Bus control module 212, for example, is any computer application, object or other implementation of a legacy bus controller (BC) 102/152 that is capable of being integrated within legacy interface 200. In an exemplary embodiment, bus control module 212 is a software implementation of a legacy bus controller that is capable of communicating with legacy interface 210 to control traffic on legacy bus 120. Examples of bus control software for MIL-STD 1553 buses are available from Condor Engineering and others. Because the BC is located in close proximity to the controlled bus segment, timeout concerns previously experienced on disjoint networks can be significantly reduced as appropriate.

In various embodiments, the computer-executable instructions for the various programs (e.g. BC module 212) included within processing module 202 are stored in digital memory, and may also be stored on a hard drive, flash memory, EEPROM or other digital storage medium. The various components of legacy interface 200 shown in FIG. 2 are intended as logical models, and may be implemented in practice with any type of hardware and/or software.

Further, the various functions of the modules described may be organized in different fashions in the various alternate embodiments, with a wide range of equivalent interfaces 200 having additional, fewer, different, or differently combined modules.

A primary function of legacy interface 200 is to allow wideband capable nodes 106 to communicate with and to control legacy RTs 112, 114 in their native format. In a typical scenario, wideband-capable nodes 106 normally initiate command requests for data from the RTs 112, 114, with the RTs responding as appropriate. In operation, legacy interface 200 suitably acts as a bridge or other interface between legacy network 120 and wideband network 118 in response to control instructions from processing module 202. Accordingly, processing module 202 suitably includes instruction routines and/or modules to receive data from the wideband and legacy buses, and to re-transmit the data on the other network links 118, 120 as appropriate to reach their intended destination, and as described more fully below. In various embodiments, processing module 202 is able to receive wideband data from wideband nodes 106 of appropriately sized multiword legacy messages for relay to legacy RTs 112,114 via interface 200 and RIU 108. Processing module 202 conversely is able to receive data (e.g. reply data) from legacy bus 120 and to place such data onto wideband bus 118 to be received by wideband capable nodes 106. Communications are therefore appropriately allowed to proceed in a bi-directional manner, with interface 200 acting as a bridge between bus 118 and bus 120 for communications originating on either bus.

Figure 3:
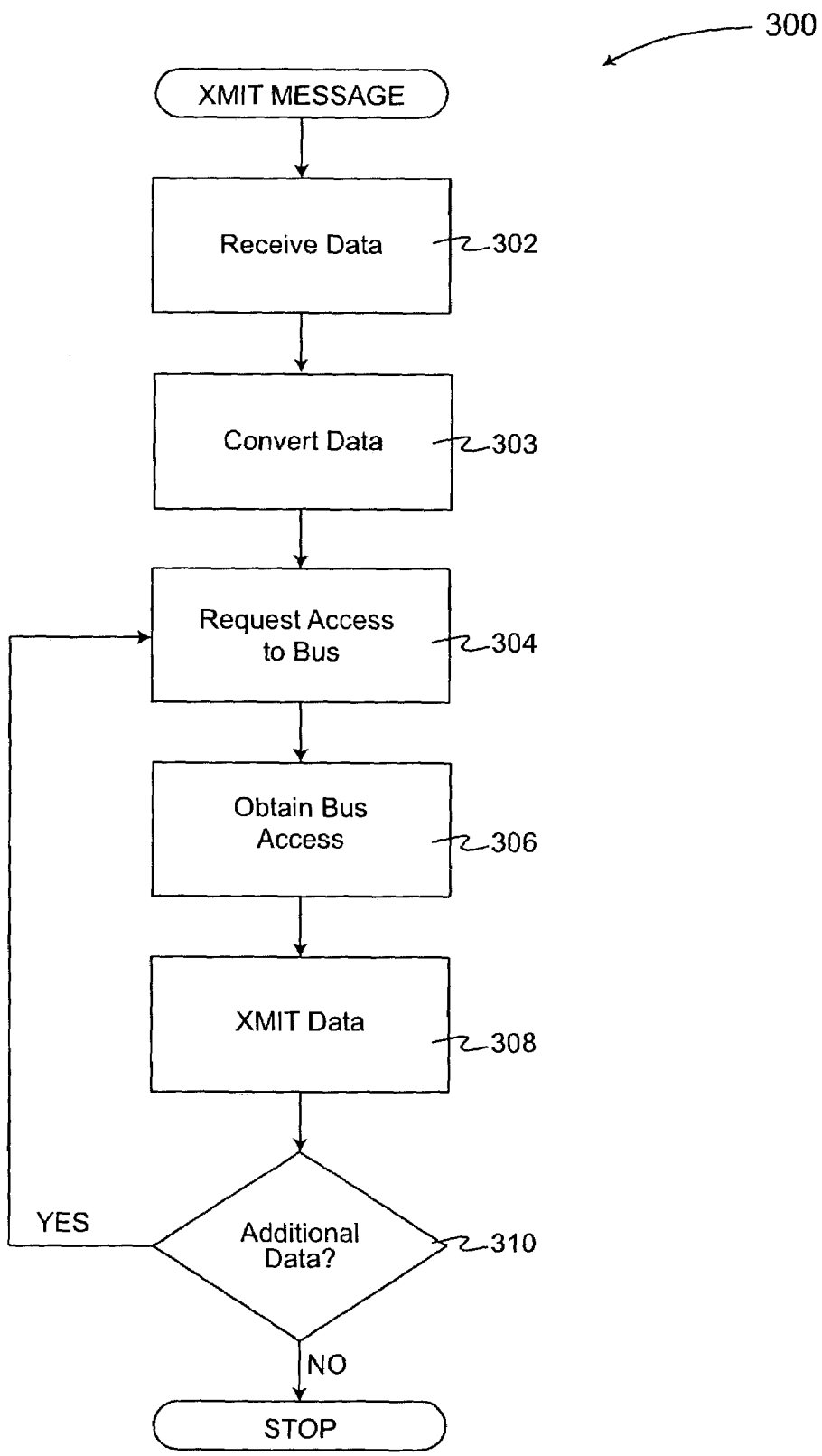
FIG. 3 is a flowchart of an exemplary process for transmitting legacy data on a high-speed data bus.

With reference now to FIG. 3, an exemplary process 300 for providing bi-directional access between a wideband data bus 118 and a legacy bus 120 for passing legacy data between wideband nodes 106 and RTs 112,114 suitably includes the broad steps of receiving the legacy data on either legacy bus 120 or wideband bus 118 (step 302), converting the legacy data to an appropriate format for transmission on the other bus (step 303), issuing a request, as necessary, for access to the other bus (step 304), obtaining access to the bus (step 306), and transmitting the data on the other bus (steps 308, 310). In an exemplary embodiment, process 300 may be implemented and/or controlled in any manner, such as with a digital computer executing programming instructions stored on any digital storage medium such as a static or dynamic random access memory (RAM), floppy disk, compact disk, read-only memory (ROM), or any other digital, optical, and/or electromagnetic storage medium.

Legacy data may be received from a wideband-enabled node 106 on wideband bus 118 or from a RT 112, 114 on legacy bus 120 as appropriate. As legacy data is received at a legacy interface 200 (step 302), the legacy data is appropriately formatted (e.g. by processing module 202) for transmission on the other bus. Legacy data from legacy bus 120, for example, may be combined or broken into wideband messages of appropriate size and/or placed within wideband data packets for transmission on wideband bus 118. Conversely, legacy data received on wideband data bus 118 can be joined, divided and/or formatted as appropriate for transmission on legacy bus 120. To transmit the data on the desired bus, legacy interface 200 suitably places an access request, as necessary, on the bus to provide a bridge between the two buses (step 304). The access request may be placed in any appropriate format, and in an exemplary embodiment the request conforms to the arbitration methods provided in IEEE 1394a and 1394b link level implementations. Access to wideband bus 118 may be obtained in any manner (step 306).

Data may be formatted and/or placed on the bus in any number of appropriately-sized single or multi-word messages (steps 303, 308, 310). In an exemplary embodiment, entire multiword legacy messages may be transmitted as single messages on wideband bus 118. An appropriate number of transmitted words for each wideband bus access may be determined to accommodate particular system tolerances and to account for extra latency introduced to the data stream by buffering data cue-up times at legacy interface 200. As an exemplary implementation involving the popular MIL STD 1553 legacy interface with maximum message lengths on the order of thirty words long, such added latency may be on the order of six hundred microseconds or so in each direction. For total messages comprising in excess of thirty words for any given command or RT response, such multiple message portions may be further aggregated into even larger groupings for each wideband bus access consistent with the acceptable level of extra latency thereby introduced. As such, a maximum message grouping length on the IEEE 1394 data bus may be set to be consistent with system tolerances to introduced data latency.

Figure 4:
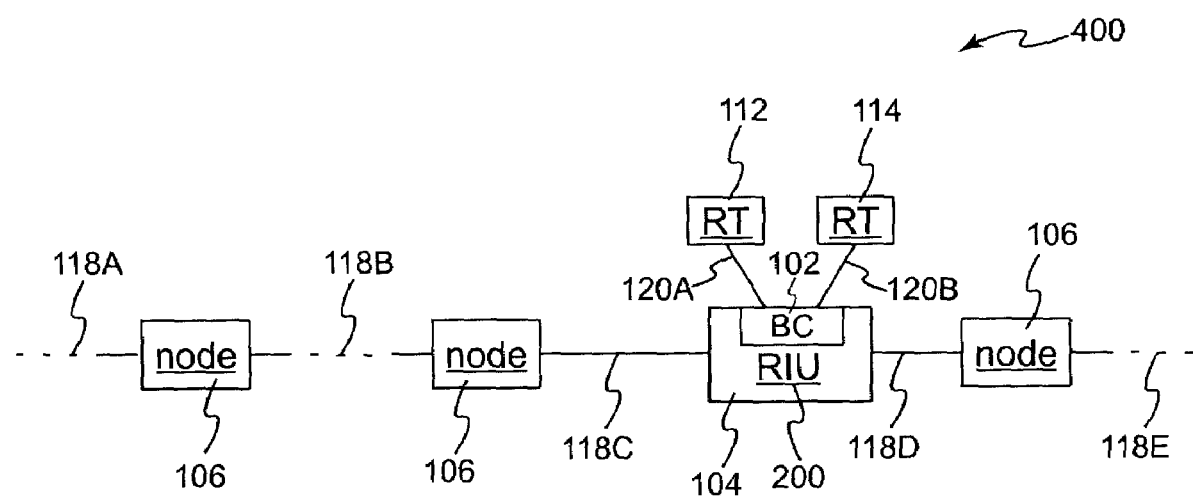
FIG. 4 is a block diagram of an exemplary system for facilitating legacy data transmission on a high-speed data bus including a legacy interface that includes a hybrid bus controller and a remote interface unit.

Accordingly, the functions of the bus controller and legacy interface may be combined into a single interface component and incorporated into a hybrid network environment 400, as shown in FIG. 4. With reference now to FIG. 4, an exemplary system 400 includes a legacy interface 200 that suitably includes both bus controller 102 and RIU 104 functionality. BC functionality may be added to a legacy interface 200 through the addition of a bus controller card, for example, or by adding a software application, applet, daemon or the like, as described in conjunction with FIG. 2 above.

Legacy interface 200 with an embedded BC 102 appropriately acts as a bridge for traffic passing between the legacy and wideband buses. For data exchanged between wideband nodes 106 and R/Ts 112, 114, each wideband node simply transmits data to interface 200, which appropriately converts the data to a suitable legacy format for transmission to the RT on legacy bus 120. Return (i.e. reply) data from legacy nodes 112, 114 to wideband nodes 106 is similarly transmitted to interface 200 in legacy format across legacy bus 120A–B, which appropriately forwards the reply data to wideband nodes 106. Bus controller 102 suitably controls traffic transmitted on legacy bus 120, including data transmitted between legacy interface 200 and the various legacy components 112, 114.

While several exemplary embodiments have been presented in the foregoing detailed description, it should be appreciated that a vast number of equivalent variations exist. Although the systems and techniques described herein are frequently described as interfacing MIL-STD 1553 devices to an IEEE 1394b network, for example, the invention is not so limited. Indeed, any legacy and/or wideband technologies such as Fiber Channel or the like could be used in various alternate but equivalent embodiments. It should also be appreciated that the exemplary embodiments are only examples, and are not intended to limit the scope, applicability, or configuration of the invention in any way. Rather, the foregoing detailed description will provide those skilled in the art with a convenient road map for implementing exemplary embodiments. It should be understood that various changes can be made in the function and arrangement of elements and/or steps without departing from the scope of the invention as set forth in the appended claims and the legal equivalents thereof.

What is claimed is:

1. A method of interfacing a legacy MIL-STD 1553 data bus to a wideband IEEE-1394 data bus with a legacy interface having a bus controller module, the method comprising the steps of:
   receiving data intended for a legacy MIL-STD 1533 node at the legacy interface from a wideband IEEE-1394 capable node on the wideband IEEE-1394 data bus;
   converting the data to a legacy MIL-STD 1553 format comprising at least one data word;
   transmitting the at least one data word on the legacy MIL-STD 1553 data bus;
   receiving a reply to the at least one legacy word on the legacy MIL-STD 1553 data bus; and
   forwarding the reply to a wideband IEEE-1394 capable node using the bus controller module in the legacy interface.

2. The method of claim 1 wherein the wideband IEEE-1394 data bus is an IEEE-1394b bus.

3. A digital storage medium having computer-executable instructions stored thereon, wherein the instructions are configured to execute the method of claim 1.

4. A system for interfacing a legacy MIL-STD 1553 device with a wideband IEEE-1394 data bus, the system comprising:
   a remote interface module configured to receive data intended for a legacy MIL-STD 1553 node via the wideband IEEE-1394 data bus and to convert the data to a legacy MIL-STD 1553 format having at least one data word; and
   a bus controller module configured to control traffic on a legacy MIL-STD 1553 bus to thereby transfer the at least one data word from the remote interface module to a legacy MIL-STD 1553 component on the legacy MIL-STD 1553 bus.

5. The system of claim 4 wherein the bus controller module is further configured to receive a reply message in the legacy MIL-STD 1553 format from the remote interface module, and wherein the remote interface module is further configured to receive the reply message, to convert the reply message to a wideband IEEE-1394 format reply message, and to forward the wideband IEEE-1394 format reply message on the wideband IEEE-1394 data bus.

6. The method of claim 4 wherein the wideband IEEE-1394 data bus is an IEEE-1394b bus.

7. A system for interfacing a legacy MIL-STD 1553 bus with a wideband IEEE-1394 data bus, the system comprising:
   a legacy MIL-STD 1553 bus interface in communication with the legacy MIL-STD 1553 bus;
   a PHY layer module in communication with the wideband IEEE-1394 data bus;
   a LINK layer module in communication with the PHY layer module; and
   a processing module configured to provide a bridge between the legacy MIL-STD 1553 bus interface and the LINK layer module via an input/output subsystem, wherein the processing module is operable to receive legacy MIL-STD 1553 data from the legacy MIL-STD 1553 bus via the legacy MIL-STD 1553 bus interface, to request a timeslot on the wideband IEEE-1394 data bus for at least a portion of the legacy MIL-STD 1553 data via the LINK layer module, and to transmit the legacy MIL-STD 1553 data on the wideband data bus using the timeslot;

and wherein the processing module comprises a bus controller module configured to control traffic art the legacy MIL-STD 1553 bus via the legacy MIL-STD 1553 bus interface.

8. A method of interfacing a MIL-STD 1553 data bus to an IEEE 1394 data bus with a legacy interface comprising a bus controller module and a remote interface unit, the method comprising the steps of:

receiving a message for a MIL-STD 1553 device on the MIL-STD 1553 bus via the IEEE 1394 data bus;

converting data conveyed in the message to at least one data word in a legacy format at the remote interface unit;

controlling traffic on the MIL-STD 1553 data bus with the bus controller module to transfer the at least one data word between the remote interface unit and a MIL-STD 1553 device on the MIL-STD 1553 data bus; and repeating the controlling step until all of the data conveyed in the message is transmitted on the MIL-STD 1553 data bus.

9. The method or claim 8 further comprising the step of adjusting a maximum timeout budget for transmission of MIL-STD 1553 data.

10. The method of claim 8 further comprising the step of setting a maximum message grouping length on the IEEE 1394 data bus consistent with a tolerance to introduced data latency.

11. A digital storage medium having computer-executable instructions stored thereon, wherein the instructions are configured to execute the method of claim 8.

12. A system for interfacing a legacy MIL-STD 1553 data bus and a wideband IEEE-1394 data bus, the system comprising:

means for controlling data traffic on the legacy MIL-STD 1553 data bus;

means for receiving legacy MIL-STD 1553 data at a legacy MIL-STD 1553 interface from a legacy MIL-STD 1553 component on the legacy MIL-STD 1553 data bus, wherein the means for receiving is configured to communicate with the means for controlling;

means for converting between a legacy MIL-STD 1553 format and a wideband IEEE-1394 format, the means for converting being in communication with the means for receiving; and means for communicating with the wideband IEEE-1394 data bus, the means for communicating being in communication with the means for converting.

13. A data processing system providing an interface between a legacy MIL-STD 1553 bus and a wideband IEEE-1394 bus, the system comprising:

a legacy MIL-STD 1553 input/output module in communication with the legacy MIL-STD 1553 bus, the legacy MIL-STD 1553 input/output module comprising a bus controller module configured to control data traffic on the legacy MIL-STD 1553 bus;

a PHY layer module in communication with the wideband IEEE-1394 bus;

a LINK layer module in communication with the PHY layer module; and a processing module configured to communicate with the legacy MIL-STD 1553 input/output module and the LINK layer module via an input/output subsystem, wherein the processing module is operable to receive legacy MIL-STD 1553 data, to convert the legacy MIL-STD 1553 data between legacy MIL-STD 1553 and wideband IEEE-1394 formats, and to transmit the legacy MIL-STD 1553 data in the legacy MIL-STD 1553 and wideband IEEE-1394 formats on the legacy MIL-STD 1553 and wideband IEEE-1394 buses, respectively, to thereby provide a bridge between the legacy MIL-STD 1553 bus and the wideband IEEE-1394 bus.

* * * * *